(12) United States Patent
Brocklehurst

(10) Patent No.: US 6,481,775 B2
(45) Date of Patent: Nov. 19, 2002

(54) MOLDED VEHICLE INTERIOR TRIM

(75) Inventor: Karl Brocklehurst, Farmington Hills, MI (US)

(73) Assignee: Kay Automotive Graphics, Lake Orion, MI (US)

( * ) Notice: Subject to any disclaimer, the term of this patent is extended or adjusted under 35 U.S.C. 154(b) by 0 days.

(21) Appl. No.: 09/732,957

(22) Filed: Dec. 8, 2000

(65) Prior Publication Data

US 2002/0070583 A1 Jun. 13, 2002

(51) Int. Cl.$^7$ ................................................ E04B 1/82
(52) U.S. Cl. ....................... 296/39.1; 296/146.7; 428/31
(58) Field of Search ............................. 296/39.1, 146.7; 49/502; 428/31

(56) References Cited

U.S. PATENT DOCUMENTS

| | | | |
|---|---|---|---|
| 4,587,761 A | | 5/1986 | Adell |
| 4,679,290 A | | 7/1987 | Adell |
| 4,696,848 A | | 9/1987 | Jones et al. |
| 4,923,542 A | * | 5/1990 | Janicki et al. ....... 296/146.7 X |
| 5,090,762 A | | 2/1992 | Krieger |
| 5,456,513 A | * | 10/1995 | Schmidt .................... 296/39.1 |
| 5,482,343 A | * | 1/1996 | Bradac ...................... 296/39.1 |
| 5,688,015 A | | 11/1997 | Patterson et al. |
| 5,725,924 A | * | 3/1998 | Keys ................... 296/146.7 X |
| 5,851,626 A | * | 12/1998 | McCrorry et al. ... 296/146.7 X |
| 5,923,331 A | * | 7/1999 | Jones et al. .......... 296/146.7 X |
| 6,127,021 A | * | 10/2000 | Kelman ............... 296/146.7 X |
| 6,286,889 B1 | * | 9/2001 | Kim ........................ 296/146.7 |

FOREIGN PATENT DOCUMENTS

DE  3502056  * 7/1986  .............. 296/146.7

* cited by examiner

Primary Examiner—Joseph D. Pape
(74) Attorney, Agent, or Firm—Carlson, Gaskey & Olds, P.C.

(57) ABSTRACT

A vehicle interior trim piece includes a plurality of layers sandwiched together. A primary layer is preferably a vacuum formed ABS plastic material which is formed to directly conform to an exposed surface portion of a vehicle closure member. An outer surface layer is sandwiched to the primary layer and is the surface which is exposed after installation and as such is preferably of a color identical to the vehicle interior. Most preferably, the outer surface layer is a PVC film which is textured to have an appearance indistinguishable from the vehicle interior trim. The surface opposite the outer surface layer is a pressure sensitive adhesive layer which coats the inner surface of the primary layer. Because the trim piece is preformed to the shape of the exposed portion of the vehicle closure member the trim piece can be rapidly oriented in the correct installation position in an assembly line environment. Moreover, the preshaped and semi-rigid material of the trim piece assures a proper fit and a high quality surface.

22 Claims, 3 Drawing Sheets

MOLDED VEHICLE INTERIOR TRIM

BACKGROUND OF THE INVENTION

The present invention relates to an interior trim piece for a vehicle, and more particularly to an adhesive backed molded trim piece which conceals exposed vehicle body portions within a vehicle interior.

Vehicle bodies are commonly painted a complementary yet different color from the vehicle interior. The vehicle body is typically painted prior to the installation of the vehicle interior and is painted on all surfaces. In many instances a vehicle interior fails to completely conceal all interior surfaces within the vehicle body. In such cases, the vehicle body color will be clearly visible as a contrasting color from the vehicle interior color. This may be noticeable in areas where a vehicle closure member such as vehicle doors, lift gates, hatch backs and the like, meet with the vehicle interior. For example, the vehicle body color on the interior of a vehicle door may be visible between the interior trim attached to the door and the interior trim surrounding the vehicle door. This is undesirable from an aesthetic standpoint and is of growing concern to discerning vehicle customers. Vehicle doors provide further difficulties, as seals for windows typically must extend over some portion of the vehicle door frame.

One know method of concealing the exposed vehicle body color is through the use of tape. The tape is color matched to the vehicle interior and is applied over the exposed vehicle body areas. However, areas which are most prone to being left uncovered by the vehicle interior are commonly of a complex shape having a multiple of curves. The application of tape to these areas is therefore likely to result in creases, bubbles, and wrinkles which defeat the purpose of providing an aesthetically pleasing interior. The tape also fails to match the texture of the vehicle interior. Moreover, the application of tape is time consuming and typically not conducive to an assembly line environment.

It is therefore desirable to provide an inexpensive way to effectively conceal painted vehicle body portions exposed between vehicle interior trim pieces while minimizing the effect on assembly line installation procedures.

SUMMARY OF THE INVENTION

The vehicle interior trim piece according to the present invention includes a plurality of layers sandwiched together. A primary layer is preferably a vacuum formed ABS plastic material which is formed to directly conform to an exposed surface portion of a vehicle closure member. The exposed surface portion is typically a portion of the vehicle closure member that is painted the color of the vehicle exterior and would otherwise be readily noticeable between interior trim pieces which are typically colored differently than the exposed portion.

An outer surface of the primary layer is the surface which is exposed after installation and as such is preferably of a color identical to the vehicle interior. Most preferably, the outer surface is textured to have an appearance indistinguishable from the vehicle interior trim.

In another embodiment an outer surface layer is sandwiched to the primary layer. Most preferably, the outer surface layer is a PVC film which is textured to have an appearance indistinguishable from the vehicle interior trim. The surface opposite the outer surface layer is a pressure sensitive adhesive layer which coats the inner surface of the primary layer. The adhesive layer is covered by a backing material which protects the adhesive until the trim piece is readied for application. The trim piece is readied for application simply by removing the backing material and exposing the adhesive layer. Preferably, a removal tab extends beyond the outer perimeter of the trim piece to assist in efficient removal of the backing material. Because the trim piece is preformed to the shape of the exposed portion of the vehicle closure member the trim piece can be rapidly oriented in the correct installation position in an assembly line environment. Moreover, the preshaped and semi-rigid material of the trim piece assures a proper fit and a high quality surface.

Another embodiment of the present invention provides a separation line for the removal of only a portion of the backing material. By removing a first backing segment of the backing material, a second backing segment remains in place over the adhesive layer. The trim piece can then be initially positioned on the vehicle closure member using only the adhesive layer which is exposed below the removed first backing segment. Because the entire adhesive layer is not exposed, the trim piece can thereby be located in its correct position while minimizing the possibility that the trim piece could fold back and become attached to itself. The separation line also provides other installation advantages. By installing a portion of the trim piece between a window seal and a vehicle door frame, the trim piece can be initially positioned without removing any of the backing material.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
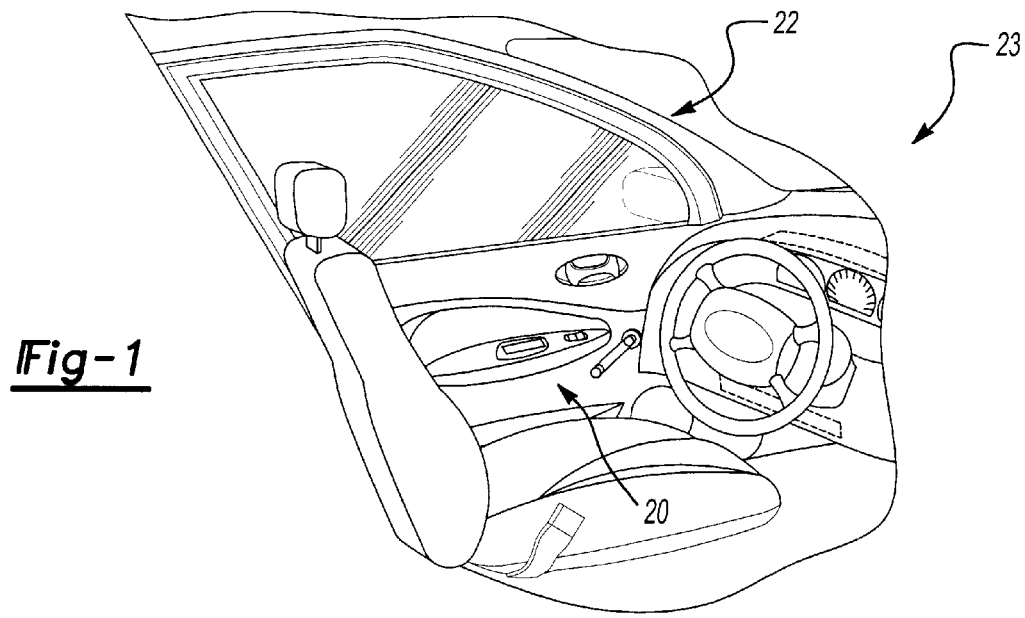
FIG. 1 is a general perspective view of a vehicle interior.

FIG. 1 illustrates a vehicle door 20 adjacent a vehicle frame 22 as viewed from the interior of a vehicle 23 when the vehicle door 20 is closed. Although a vehicle door will be described in the disclosed embodiment, it will be realized that many other vehicle closure members will benefit from the present invention.

Figure 2:
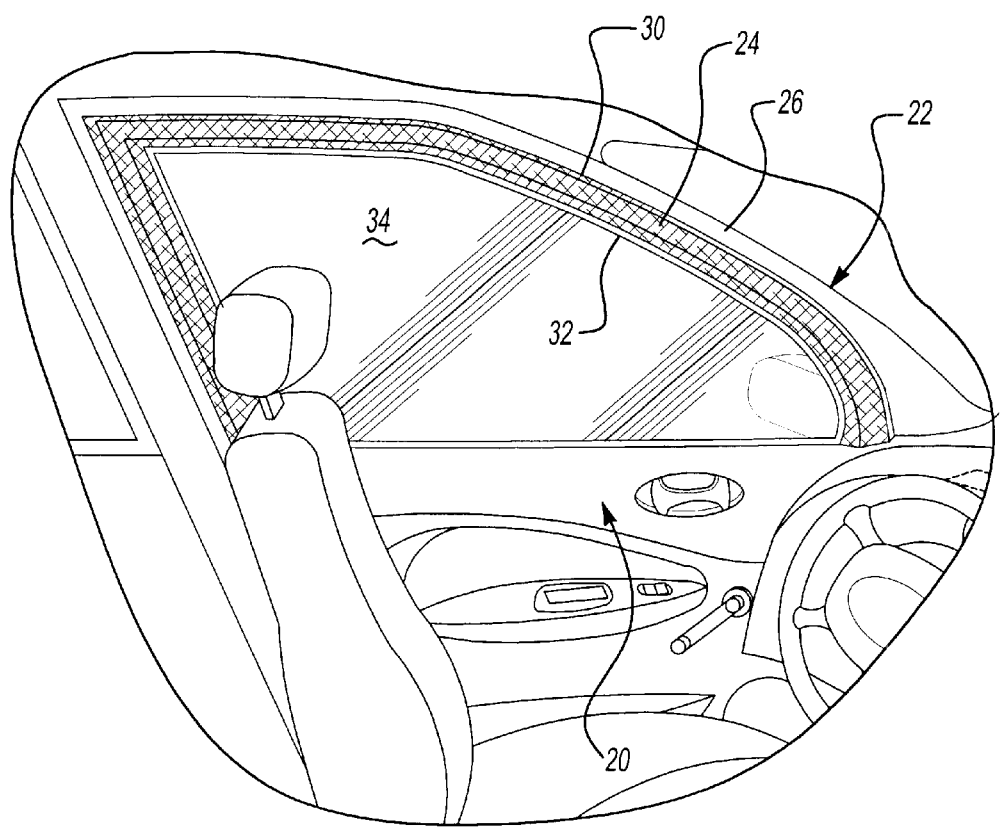
FIG. 2 is a side view of a vehicle closure member illustrating an exposed portion of the vehicle frame which is typically uncovered by the vehicle interior.

Referring to FIG. 2, and expanded view of the vehicle door 20 and vehicle frame 22 is illustrated. As illustrated, an exposed surface portion (illustrated by hatching 24) of the vehicle door 20 is visible between an interior trim piece 26 and a window seal 32. Notably, the exposed surface portion 24 is a portion of the vehicle door frame 30. The exposed portion 24 is painted the color of the vehicle exterior and will therefore be readily noticeable between the interior trim pieces 26 which will most likely be a color different than the exposed portion 24.

The window seal 32 is located around the window opening 34 in the vehicle door 20. The window seal 32 fits along the window opening 34 and lies over the vehicle door frame 30. The vehicle window opening 34 increases the complexity of the exposed portion 24 as the vehicle door frame 30 includes a plurality of bends adjacent the window opening 34 in addition to the vehicle door 20 shape.

Figure 3:
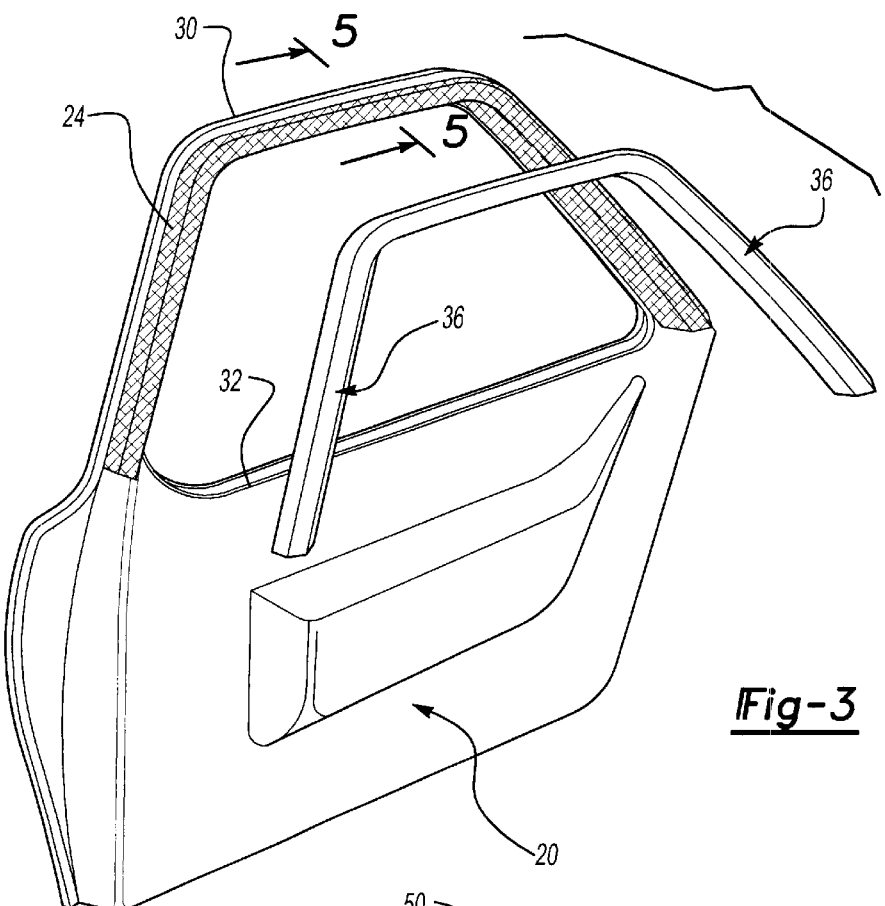
FIG. 3 is a perspective view of the vehicle closure member of FIG. 2 adjacent a vehicle interior trim piece according to the present invention.

Referring to FIG. 3, a plurality of vehicle interior trim pieces 36 according to the present invention are illustrated substantially adjacent their mounting location on the vehicle door 20. Although two (2) trim pieces 36 are illustrated in the disclosed embodiment, a greater or lesser number of trim pieces 36 may be utilized depending on the size and shape of the vehicle closure member and complexity of the surface to be covered. As illustrated the trim pieces 36 are manufactured to conform to the surface to which the trim pieces 36 are to be applied. As the trim pieces 36 are manufactured to fit the exposed surface portion 24, a proper fit and a high quality surface is practically assured.

Figure 4:
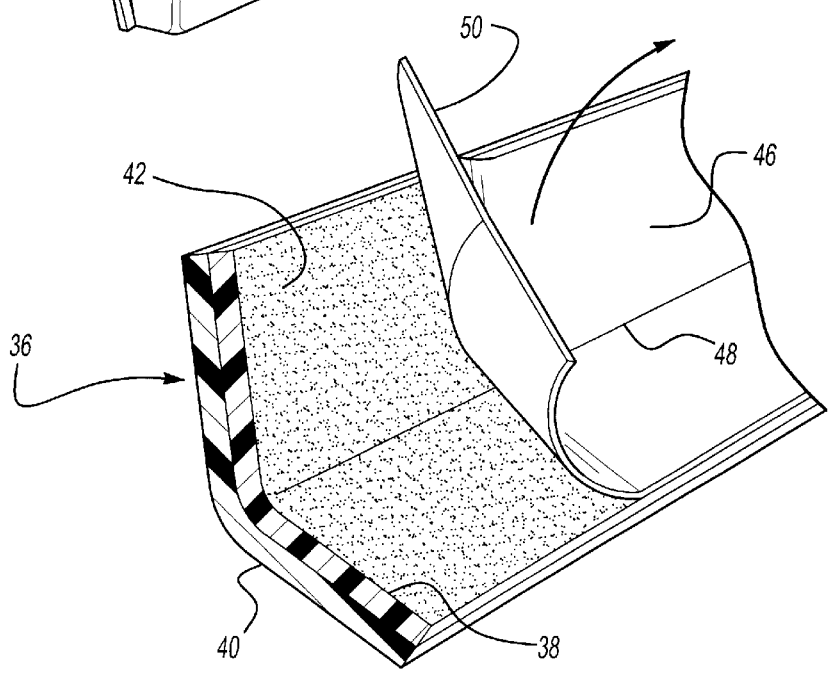
FIG. 4 is a perspective view of one embodiment of the vehicle interior trim piece according to the present invention.

Referring to FIG. 4, each trim piece 36 includes a plurality of layers sandwiched together. However, it should be understood that the layers may be formed as a single integral piece. The primary layer 38 is preferably a vacuum formed ABS plastic material which is formed to directly conform to the exposed surface portion 24 (FIG. 3). The primary layer 38 preferably maintains its molded shape yet provides some flexibility to assist installation.

An outer surface layer 40 is sandwiched to the primary layer 38. The outer surface layer 40 is adjacent the outer surface 39 of the primary layer 38. The outer surface 39 is the surface which is exposed after installation and as such is preferably of the identical color to the vehicle interior trim pieces 26 (FIG. 2). The outer surface layer 40 is a PVC film which is textured to have an appearance indistinguishable from the vehicle interior trim pieces 26 (FIG. 2). It should be understood that the outer surface layer 40 may be formed internally with the primary layer 38. In other words, the textured appearance is formed directly into the outer surface layer 40. Accordingly, the outer surface layer 40 blends into the vehicle interior. The outer surface layer 40 may also be a neutral color such as black.

It should also be understood that the outer surface 39 of the primary layer 38 can be configured to have an appearance indistinguishable from the vehicle interior trim pieces 26 (FIG. 2). By directly configuring the outer surface 39, the application of the outer surface layer 40 can be avoided. The outer surface 39 of the primary layer 38 is exposed after installation and is preferably of the identical color to the vehicle interior trim pieces 26 (FIG. 2). The outer surface 39 or the entire primary layer 38 may also be colored the vehicle interior color, or a neutral color.

The surface opposite the outer surface layer 40 is a pressure sensitive adhesive layer 42 which coats the inner surface 44 of the primary layer 38. Preferably, the adhesive layer 42 is covered by a backing material 46 which protects the adhesive until the trim piece 36 is readied for application. As will be further described below, the backing material 46 preferably includes a separation line 48 and a removal tab 50.

Figure 5:
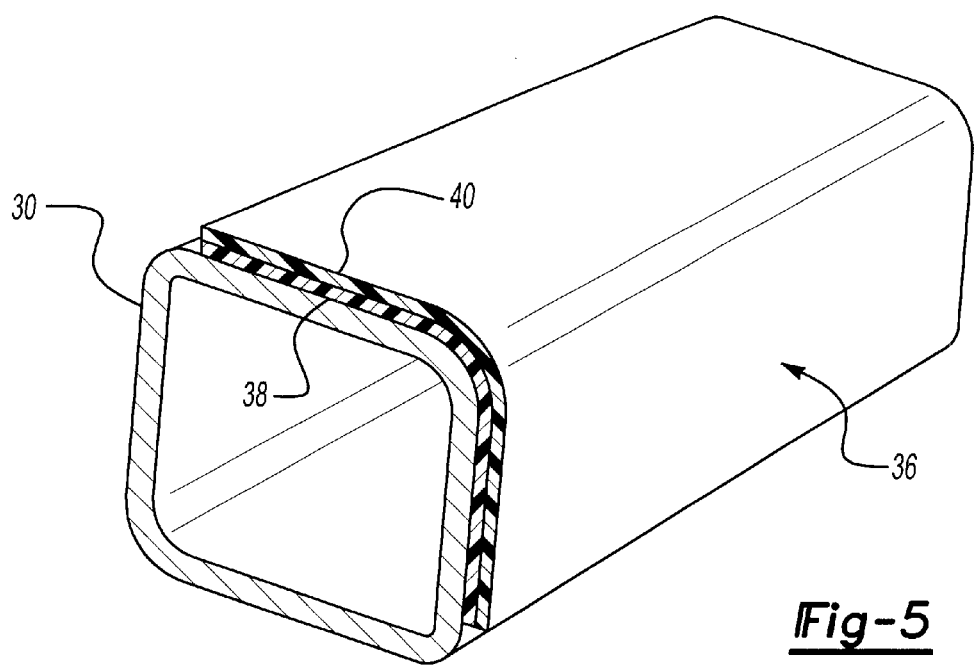
FIG. 5 is a sectional view taken along line 5—5 of FIG. 2 showing the vehicle interior trim piece attached to the vehicle frame.

The trim piece 36 is readied for application simply by removing the backing material 46 and exposing the adhesive layer 42. Preferably, the removal tab 50 extends beyond the outer perimeter of the trim piece to assist in efficient removal of the backing material 46. The trim piece 36 can then be installed in it's correct location along the vehicle door frame 30 (FIG. 5) to conceal the exposed surface 24 (FIG. 2). Because the trim piece 36 is preformed to the shape of the exposed portion 24 and vehicle door frame 30, the trim piece 36 can quickly oriented in the correct installation position in an assembly line environment. Moreover, the preshaped and semi-rigid material of the trim piece 36 assures a proper fit and a high quality surface.

Figure 6:
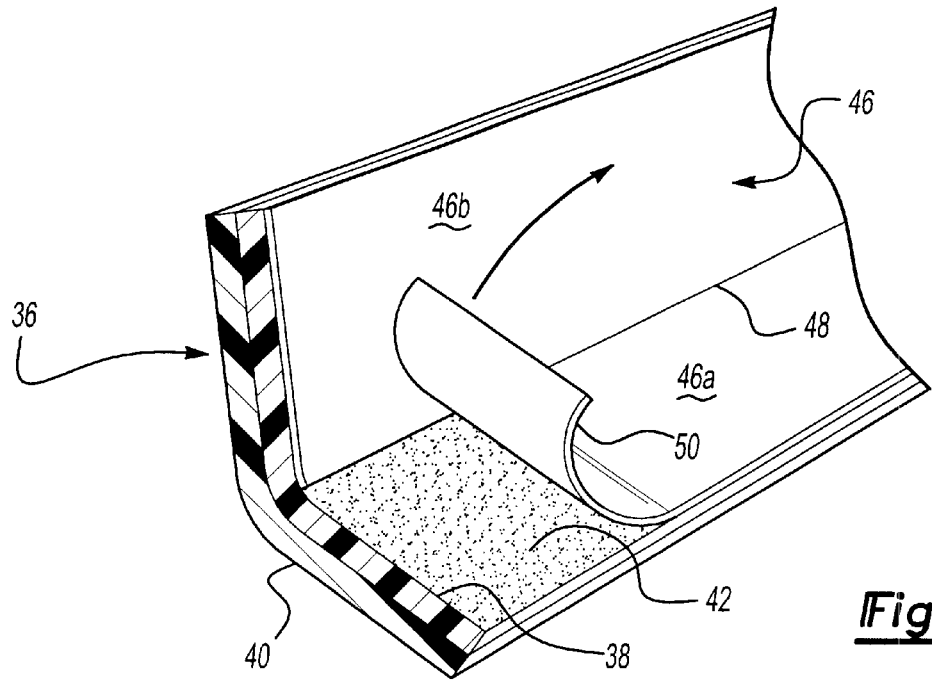
FIG. 6 is a perspective view of another embodiment of the vehicle interior trim piece according to the present invention.

Referring to FIG. 6, another embodiment of the present invention illustrates the use of the separation line 48. The separation line 48 provides for the removal of only a portion of the backing material 46. By removing a first backing segment 46a of the backing material 46, a second backing segment 46b remains in place over the adhesive layer 42. The trim piece 36 can then be initially positioned on the vehicle door frame 30 (FIG. 2) using only the adhesive layer 42 which is exposed below the removed first backing segment 46a. Because the entire adhesive layer 42 is not exposed, the trim piece 46 can thereby be located in its correct position while minimizing the possibility that the trim piece could fold back and become attached to itself.

The separation line 48 also provides other installation advantages. By installing a portion of the trim piece 36 between the window seal 32 (FIG. 2) and the vehicle door frame 30, the trim piece can be initially positioned without removing any of the backing material 46. Once the trim piece 36 is positioned, the second backing segment 46b of the backing material 46 is removed by grasping the removal tab 50. The second backing segment 46b is removed to expose the adhesive layer 42 and the trim piece 36 is adhered to the vehicle door frame 30. The trim piece 36 is thereby again quickly installed and retained in place by the adhesive layer 42 below the removed second backing segment 46b and the window seal 32.

The present invention therefore provides an inexpensive way to effectively conceal painted vehicle body portions exposed between vehicle interior trim pieces while minimizing the effect on assembly line installation procedures.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle interior trim piece comprising:

a non-planar primary layer for an exposed frame portion of a vehicle closure member, said primary layer having an inner surface and an outer surface;

an adhesive layer sandwiched to said inner surface of said primary layer; and said outer surface having an appearance substantially indistinguishable from a vehicle interior.

2. The vehicle interior trim piece as recited in claim 1, wherein said primary layer is molded of an ABS plastic.

3. The vehicle interior trim piece as recited in claim 1, wherein said outer surface is textured to have an appearance substantially indistinguishable from a vehicle interior.

4. The vehicle interior trim piece as recited in claim 1, wherein said outer surface is colored to have an appearance substantially indistinguishable from a vehicle interior.

5. The vehicle interior trim piece as recited in claim 1, further comprising an outer surface layer sandwiched to an outer surface of said primary layer.

6. The vehicle interior trim piece as recited in claim 5, wherein said outer surface layer is a PVC film.

7. The vehicle interior trim piece as recited in claim 5, wherein said outer surface layer is textured to have an appearance substantially indistinguishable from a vehicle interior.

8. The vehicle interior trim piece as recited in claim 5, wherein said outer surface layer is colored to have an appearance substantially indistinguishable from a vehicle interior.

9. The vehicle interior trim piece as recited in claim 1, further comprising a removable backing layer which protects said adhesive layer.

10. The vehicle interior trim piece as recited in claim 9, wherein said removable backing layer includes a removal tab which extends from the perimeter of said primary layer.

11. The vehicle interior trim piece as recited in claim 9, wherein said removable backing layer includes a separation line such that a portion of said removable backing layer is independently removable from said adhesive surface.

12. The vehicle interior trim piece as recited in claim 1, wherein said non-planar primary layer is molded to conform to said exposed frame portion.

13. The vehicle interior trim piece as recited in claim 1 wherein said non-planar primary layer is molded to conform at least partially around a window opening of said exposed frame portion.

14. A vehicle interior trim piece comprising:
   a primary layer molded to conform to an exposed frame portion of a vehicle closure member, said primary layer having an inner surface and an outer surface;
   an adhesive layer sandwiched to said inner surface of said primary layer;
   said outer surface colored to provide an appearance substantially indistinguishable from a vehicle interior; and
   a removable backing layer which protects said adhesive layer.

15. The vehicle interior trim piece as recited in claim 14, wherein said primary layer is molded of an ABS plastic.

16. The vehicle interior trim piece as recited in claim 14, wherein said outer surface is textured to have an appearance substantially indistinguishable from a vehicle interior.

17. The vehicle interior trim piece as recited in claim 14, further comprising an outer surface layer sandwiched to an outer surface of said primary layer.

18. The vehicle interior trim piece as recited in claim 14, wherein said outer surface layer is a PVC film.

19. The vehicle interior trim piece as recited in claim 14, wherein said outer surface layer is textured to have an appearance substantially indistinguishable from a vehicle interior.

20. The vehicle interior trim piece as recited in claim 14, wherein said primary layer is colored black.

21. The vehicle interior trim piece as recited in claim 14, wherein said removable backing layer includes a removal tab which extends from the perimeter of said primary layer.

22. The vehicle interior trim piece as recited in claim 9, wherein said removable backing layer includes a separation line such that a portion of said removable backing layer is independently removable from said adhesive surface.

* * * * *